United States Patent [19]
Adrian et al.

[11] 3,954,491
[45] May 4, 1976

[54] PROCESS FOR PRODUCTION OF RAW MIX CEMENT SLURRIES HAVING REDUCED WATER CONTENT

[75] Inventors: Norman F. Adrian, West Caldwell; Joseph P. Fleming, East Brunswick, both of N.J.

[73] Assignee: Diamond Shamrock Corporation, Cleveland, Ohio

[22] Filed: Oct. 21, 1974

[21] Appl. No.: 516,398

[52] U.S. Cl. ........................... 106/100; 106/72; 106/90; 106/119; 106/288 B
[51] Int. Cl.² ................... C04B 7/38; C04B 7/42; C04B 33/13
[58] Field of Search ............... 106/100, 90, 93, 92, 106/72, 119, 288 B

[56] References Cited
UNITED STATES PATENTS

| | | | |
|---|---|---|---|
| 2,390,225 | 12/1945 | Sherman et al. | 106/100 |
| 2,709,661 | 5/1955 | Dietz | 106/100 |
| 2,905,565 | 9/1959 | Dietz | 106/100 |
| 3,277,162 | 10/1966 | Johnson | 106/90 X |
| 3,359,225 | 12/1967 | Weisend | 106/93 |
| 3,594,203 | 7/1971 | Sawyer et al. | 106/72 |

*Primary Examiner*—Helen M. McCarthy
*Attorney, Agent, or Firm*—Neal T. Levin; Leslie G. Nunn

[57] ABSTRACT

Addition of sodium naphthaleneformaldehyde sulfonate having a lowest elution volume of from about 61 to about 70% of a total elution volume by gel permeation chromatography to the raw mix slurry used in manufacture of cement by the wet process permits reduction of the water content of the raw mix slurry and conservation of the amount of fuel required to evaporate the water from the slurry during manufacture.

4 Claims, No Drawings

PROCESS FOR PRODUCTION OF RAW MIX CEMENT SLURRIES HAVING REDUCED WATER CONTENT

BACKGROUND OF THE INVENTION

1. Field of the Invention

This invention relates to an improved process for reducing water content of raw mix slurries used in the manufacture of cement by the wet process.

2. Description of Prior Art

In the manufacture of cement by the wet process, a slurry of the raw mix is pumped through pipes into the kiln where water is evaporated and the raw mix calcined to obtain Portland cement. It is desirable to reduce the water content of the raw mix slurry without increasing or altering the viscosity of the slurry. Numerous processes using chemical compositions as water reductants in raw mix slurries have been proposed. For example, U.S. Pat. No. 2,709,661 - Dietz - issued May 31, 1955 describes reduction of water in raw mix slurries by the use of alkali metal salts such as alkali metal polyphosphates, alkali metal polythiophosphates, alkali metal polysilicates, alkali metal polymolybdates, alkali metal polyvanadates, or alkali metal salts of polyboric-polyphosphoric acid in conjunction with a salt of methylene naphthalene sulfonic acid and sufficient sodium carbonate to adjust the pH of the slurry to 6.5 - 9.5.

The salt of methylene naphthalene sulfonic acid described in the above patent is a member of the class of alkyl naphthalene sulfonates having two or more naphthalene rings joined by methylene groups. The formula for methylene naphthalene sulfonic acid is:

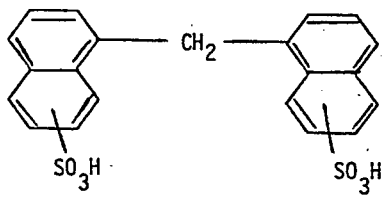

Other members in this class are of indefinite composition and are manufactured by heating naphthalene, formaldehyde and sulfuric acid together or by heating naphthalenesulfonic acid with formaldehyde. In this manner, three or more naphthalene rings may be joined together by methylene groups to obtain a low molecular weight condensation polymer.

Sodium salts of sulfonated naphthaleneformaldehyde condensates are used as extensively as dispersing agents for pigments and are classified as surfactants. These condensates are offered under a variety of names and are well known in the art. They have been described by a variety of chemical names such as the sodium salt of a condensed mononaphthalene sulfonic acid, sodium salt of a sulfonated naphthalene formaldehyde condensate, sodium salt of condensed naphthalene sulfonic acid and sodium naphthaleneformaldehyde sulfonate.

Even though the process described in the above patent reduces the moisture content of the slurry, there is a definite need for improved additives.

SUMMARY OF THE INVENTION

An improved process has been discovered for reducing the water content of raw mix slurries used in the manufacture of cement by the wet process. This improvement involves addition of sodium naphthaleneformaldehyde sulfonate having a lowest elution volume of from about 61 to about 70% of a total elution volume by gel permeation chromatography to the raw mix slurry used in manufacture of cement to reduce the moisture content of the slurry and conserve the amount of fuel required to evaporate water from the slurry during calcining. From about 0.025 to about 0.1% solids by weight of the sodium naphthaleneformaldehyde sulfonate based on the % solids present in the slurry may be added to the raw mix slurry to reduce the water content of the slurry. Water content of the slurry may vary about 20% to about 50% with the preferred water content being from about 30% to about 40% by weight based on the total weight of the slurry. The sulfonate may be added at any desired point during the preparation of the slurry.

DESCRIPTION OF PREFERRED EMBODIMENTS

A sodium naphthaleneformaldehyde sulfonate having a lowest elution volume of from about 61 to about 70% of a total elution volume by gel permeation chromatography may be added to the slurry at any time during its preparation, that is, before or during the grinding of the rock material or in the preparation of the slurry after grinding. If the material is added during the grinding of the rock material, there may be improvement in the comminuting of the mill. If so, the improvement will be shown by smaller particle size in the slurry. The rock material is argillaceous limestone material which upon burning produces cement.

In the wet cement process, raw materials are ground with water to produce a slurry of creamy consistency. The principal raw materials in the raw Portland cement mix are lime and silica and the fluxing agents are alumina and ferric oxide. Other oxides may be present as impurities in the rock but are not essential. Still other components are proscribed beyond certain specified limits because they induce harmful effects.

Major sources of lime in Portland cement mixes include limestone, cement rock, chalk, marl, shell residues and blast furnace slag. Major sources of argillaceous material in these mixes include clay, shale, slate, cement rock and blast furnace slag. Chemical limitations on limestones used in these mixes are very exacting and preclude use of a wide variety of limestones which may be suitable for other purposes. For example, limitations on sulfur trioxide exclude limestones containing appreciable gypsum while limitations on magnesia exclude limestones containing appreciable dolomite. Specifications for Portland cements have limitations on chemical composition of raw materials as well as how the cements are produced. Further, multiplicity of these limitations narrows the permissible variation in the chemical composition of the raw materials to a restrictive range.

Small quantities of the sodium naphthaleneformaldehyde sulfonate are required to reduce the water content of the raw mix slurry while retaining practically the same viscosity. Quantities of from about 0.025 to about 0.1% by weight of the sulfonate based on total weight of the solids present in the slurry may be used. However, the amount of sulfonate added may be varied over wider limits if necessary to obtain the desired viscosity, pumpability or other slurry property.

When the slurry is charged to the kiln, the water evaporates and the raw materials in the mix are burned to clinker. At the kiln temperature, the sodium naphthaleneformaldehyde sulfonate is destroyed and has no further effect in the manufacturing process.

Gel permeation chromatography is used to evaluate sodium naphthaleneformaldehyde sulfonate for use in this invention. Gel permeation chromatography is a method of separation of the components of a polymeric material. It is accomplished by separation of the components according to their respective effective molecular volumes.

For a given homologous polymeric material of varying molecular volumes, a gel permeation chromatography packing material may be selected such that the components are effectively separated and their respective profile can be plotted on a chart. Molecular volume, for a given homologous polymeric species, is directly related to its molecular weight and as such a plot of a molecular volume profile can be thought of as a plot of a profile of different molecular weights.

Samples of sodium naphthaleneformaldehyde sulfonate may be diluted in distilled water to approximately 0.1% (w/v) solution and pumped through a 4 feet × ⅜ inch diameter column of a gel permeation packing at a flow rate of 3 ml/min. The packing is made of polymeric polyethylene dimethylmethacrylate of such pore size that it will separate standard polydextrans in the molecular weight range of 1000 to 2,000,000.

When the effluent is eluted into a differential refractometer and the resultant signal recorded on a strip chart recorder, a chart profile is obtained which shows a change in refractive index of the effluent with time. The time is, at constant flow rate, a direct function of elution volume ($V_e$) through the gel-permeation column.

Each component will elute at a unique finite $V_e$ at constant flow rate of effluent. The molecular volume component corresponding to the highest molecular weight is eluted first and then the decreasing molecular volume components are eluted in decreasing order of elution time. The area generated by the elution from the column, as monitored by the differential refractometer, is directly proportional to the amount of component in the polymeric material with which it is identified. By totaling these areas, one can compute the percent of each component present in a given polymeric material.

The profiles of percent distribution of different molecular weights (directly related to area distribution of molecular volumes) may differ for sodium naphthaleneformaldehyde sulfonate depending upon their polymeric components. The following is a series of tables showing the molecular volume distribution at its respective $V_e$ (elution volume) for each polymeric material chromatographed:

Samples of sodium naphthaleneformaldehyde sulfonates by gel permeation gave the following results:

| Sample A | $V_e$ (ml) | % Area Distribution |
|---|---|---|
|  | 18.6 | 70.4 |
|  | 27.6 | 13.5 |
|  | 30.0 | 10.5 |
|  | 36.0 | 1.4 |
|  | 48.6 | 4.1 |
| Sample B | 18.0 | 61.0 |
|  | 27.6 | 19.4 |
|  | 30.0 | 10.6 |

-continued

| Sample A | $V_e$ (ml) | % Area Distribution |
|---|---|---|
|  | 36.0 | 1.1 |
|  | 45.6 | 8.1 |
| Sample C | 18.0 | 30.3 |
|  | 25.8 | 7.0 |
|  | 27.6 | 29.0 |
|  | 46.8 | 9.3 |
|  | 65.4 | 24.3 |
| Sample D | 17.4 | 32.0 |
|  | 27.6 | 11.1 |
|  | 28.8 | 35.9 |
|  | 59.3 | 3.4 |
|  | 61.8 | 17.6 |

Thus it can be noted that weight, lowest $V_e$, corresponding to the highest molecular weights, is in the range of 61–70% of the total polymer for Samples A through B and the lowest $V_e$, corresponding to the highest molecular weight for Samples C through D is in the 30–32% range. It will be noted that Samples C through D are more closely related to the sodium methylene naphthalene sulfonates described in U.S. Pat. No. 2,709,661 — Dietz above.

For a fuller understanding of the nature and objects of this invention, reference may be made to the following examples. These examples are given merely to illustrate the invention and are not to be construed in a limiting sense. All parts, proportions and quantities are by weight unless otherwise indicated. The terms %, rpm and cps are used to indicate % by weight, revolutions per minute and centipoises respectively, in these examples.

EXAMPLE 1

Effectiveness of various sodium naphthaleneformaldehyde sulfonate samples as viscosity reductants for raw mix cement slurries was determined by the following procedure.

The initial viscosity of each of the raw mix cement slurries shown in Table I and II was determined using a Brookfield LVT viscometer at 30 and 60 rpm respectively. Each slurry was stirred in the viscometer for 30 seconds before the viscosity was measured. Water content of each slurry was determined by the Dean Stark distillation method (ASTM method D-500-45). After the initial viscosity and moisture measurements were made with each slurry, water content of the slurry was reduced by decanting off the supernatant liquid and determining the reduced water content of the slurry. The various samples of sodium naphthaleneformaldehyde sulfonate, that is, Sulfonate Sample B, Sulfonate Sample C and Sulfonate Sample D were evaluated using 200 grams of the slurry having the reduced water content and then adding 0.03%, 0.05% or 0.07% solid of one of sulfonate samples based on the solids content of the slurry to the slurry. The slurry and the sulfonate sample were mixed for 30 seconds on a multi-mixer blender and the viscosity was determined with the Brookfield viscometer. Results of these tests are shown in Tables I and II below. A No. 3 Spindle was used in all of the tests in Tables I and II except in the test with Sulfonate Sample C at 0.05% in the Hudson, N.Y. sample and the test on the Cementon, N.Y. Type II sample having a reduced water content of 30%. A No. 4 Spindle was used in these two tests.

TABLE I

| Origin | RAW MIX CEMENT SLURRY Initial Water Content % By Wt. | Initial Viscosity cps | Reduced Water Content % By Wt | VISCOSITY IN CPS AT 30 RPM AFTER ADDITION OF INDICATED QUANTITY OF ||||||||
|---|---|---|---|---|---|---|---|---|---|---|---|---|
| | | | | sulfonate Sample B ||| sulfonate Sample C ||| sulfonate Sample D |||
| | | | | 0.03% | 0.05% | 0.07% | 0.03% | 0.05% | 0.07% | 0.03% | 0.05% | 0.07% |
| Hudson, N.Y. | 35.5 | 2420 | 28.5 | >4000 | 3080 | 400 | — | 8000 | 2980 | — | — | 2800 |
| Lime Kiln, Maryland | 38 | 1540 | 28 (a) | 2980 | 720 | 120 | 3100 | 2740 | 2000 | 3200 | 3200 | 1720 |
| Cementon, N.Y. Type I | 33.5 | 2200 | 26 | — | 3540 | 1080 | — | — | >4000 | — | — | 3100 |
| Cementon, N.Y. Type II | 35 | >4000 | 30 (b) | 372 | 1352 | 540 | 2004 | 2632 | 1868 | 1372 | 2916 | 1752 |

(a) Viscosity at reduced water content >4,000 cps
(b) Viscosity at reduced water content 17,600 cps Brookfield LTV viscometer at 30 and 60 rpm to obtain

TABLE II

| Origin | RAW MIX CEMENT SLURRY Initial Water Content % By Wt. | Initial Viscosity cps | Reduced Water Content % By Wt | VISCOSITY IN CPS AT 60 RPM AFTER ADDITION OF INDICATED QUANTITY OF ||||||||
|---|---|---|---|---|---|---|---|---|---|---|---|---|
| | | | | Sulfonate Sample B ||| Sulfonate Sample C ||| Sulfonate Sample D |||
| | | | | 0.03% | 0.05% | 0.07% | 0.03% | 0.05% | 0.07% | 0.03% | 0.05% | 0.07% |
| Hudson, N.Y. | 35.5 | 1360 | 28.5% | >2000 | 1800 | 260 | — | 4670 | 1650 | — | — | 1570 |
| Lime Kiln, Maryland | 38 | 860 | 28 (a) | 1740 | 430 | 86 | >2000 | 1740 | 1290 | >2000 | 1830 | 1020 |
| Cementon, N.Y. Type I | 33.5 | 1200 | 26 | — | >2000 | 580 | — | — | >2000 | — | — | 1780 |
| Cementon, N.Y. Type II | 35 | >2000 | 30 (b) | 236 | 788 | 322 | 1122 | 1588 | 1152 | 788 | 1684 | 998 |

(a) Viscosity at reduced water content > 3,000 cps
(b) Viscosity at reduced water content 9,400 cps

EXAMPLE II the results shown in Tables III and IV. A No. 3 Spindle was used in all of these tests.

TABLE III

| Origin | RAW MIX CEMENT SLURRY Initial Water Content % By Wt. | Initial Viscosity cps | Reduced Water Content % By Wt. | VISCOSITY IN CPS AT 30 RPM AFTER ADDITION OF INDICATED QUANTITY OF ||||||
|---|---|---|---|---|---|---|---|---|---|
| | | | | Sulfonate Sample B ||| Sulfonate Sample C |||
| | | | | 0.03% | 0.05% | 0.07% | 0.03% | 0.05% | 0.07% |
| Petoskey, Mich. | 36 | 2780 | 31 (a) | — | 3100 | 2200 | — | >4000 | >4000 |

(a) Viscosity at reduced water content >4000

The procedure of Example I was repeated with a raw mix cement slurry from Petoskey, Michigan using a

TABLE IV

| Origin | RAM MIX CEMENT SLURRY Initial Water Content % By Wt. | Initial Viscosity cps | Reduced Water Content % By Wt. | VISCOSITY IN CPS AT 60 RPM AFTER ADDITION OF INDICATED QUANTITY OF ||||||
|---|---|---|---|---|---|---|---|---|---|
| | | | | Sulfonate Sample B ||| Sulfonate Sample C |||
| | | | | 0.03% | 0.05% | 0.07% | 0.03% | 0.05% | 0.07% |
| Petoskey, Mich. | 36 | 1700 | 31 (a) | — | 1780 | 1320 | — | >2000 | >2000 |

(a) Viscosity at reduced water content >2000

EXAMPLE III

Water content of a sample of raw mix cement slurry from Lime Kiln, Maryland, as reduced from an initial water content of 38% to 25% by weight. Then the viscosity reducing effects of Sulfonate Sample A and Sulfonate Sample B on the water reduced slurry were determined by adding 0.05% and 0.07% solids of each sulfonate sample based on the solids content of the slurry to 200 gram aliquots of the slurry. The slurry and sulfonate sample were mixed for 30 seconds and the viscosity determined on a Brookfield LVT viscometer at 30 and 60 rpm, respectively, to obtain the following results:

|  | CONCENTRATION % SOLIDS | VISCOSITY cps at 30 rpm | 60 rpm |
|---|---|---|---|
| Sulfonate Sample A | 0.05% | 3400 | > 2000 |
|  | 0.07% | 1412 | 878 |
| Sulfonate Sample B | 0.05% | 3860 | > 2000 |
|  | 0.07% | 1100 | 690 |

A No. 3 Spindle was used in all of these tests.

While the invention has been described with reference to certain specific embodiments thereof, it is understood that it is not to be so limited since alterations and changes may made therein which are within the full and intended scope of the appended claims.

What is claimed is:

1. A process for the production of an aqueous slurry of comminuted argillaceous limestone material, which upon burning produces cement, the process comprising admixing with the limestone material present in the slurry, an effective amount of a sodium naphthaleneformaldehyde sulfonate having a lowest elution volume of from about 61 to about 70% of a total elution volume by gel permeation chromatography to reduce the water content of the slurry and to conserve the amount of fuel required to evaporate water from the slurry during burning wherein the effective amount is from about 0.025 to about 0.1% solids by weight of sulfonate salt based on percent solids present in the slurry and is added to a slurry wherein the water content is from 20 to about 50% by weight based on the total slurry weight.

2. The process of claim 1 wherein the sodium naphthaleneformaldehyde sulfonate has a lowest elution volume of about 61%.

3. The process of claim 1 wherein the sodium naphthaleneformaldehyde sulfonate has a lowest elution volume of about 70%.

4. The process of claim 1 wherein the water content of the aqueous slurry is from about 30 to about 40% by weight based on the total slurry weight.

* * * * *

UNITED STATES PATENT AND TRADEMARK OFFICE
CERTIFICATE OF CORRECTION

PATENT NO. : 3,954,491

DATED : May 4, 1976

INVENTOR(S) : Norman F. Adrian and Joseph P. Fleming

It is certified that error appears in the above-identified patent and that said Letters Patent are hereby corrected as shown below:

Column 4, line 2, "Sample A" should be --Sample B--; Column 4, line 15, delete "weight," and insert --the--. Column 5, Table IV in the heading, "RAM" should be --RAW--. Column 7, line 4, "as" should be --was--. Column 8, line 1, after "may" insert --be--.

Signed and Sealed this

Fifteenth Day of July 1980

[SEAL]

Attest:

SIDNEY A. DIAMOND

Attesting Officer     Commissioner of Patents and Trademarks